UNITED STATES PATENT OFFICE 2,044,468

PREPARATION OF DIALKYL ETHERS OF GLYCOL

Henry L. Cox and Thomas D. Roper, Jr., South Charleston, W. Va., assignors, by mesne assignments, to Union Carbide and Carbon Corporation, a corporation of New York No Drawing. Application November 9, 1934, Serial No. 752,288

13 Claims. (Cl. 260—151)

The invention relates to a process for the preparation of dialkyl ethers of alkylene and polyalkylene glycols. Representative of these compounds are the dimethyl, diethyl, or higher dialkyl ethers of ethylene glycol, and similar derivatives of diethylene or other polyglycols.

These chemicals are becoming increasingly useful as solvents and reagents for many purposes in the chemical industry. The prior art and literature relating to the compounds gives very little information with reference to their preparation, other than in small laboratory quantities. As derivatives of dihydric alcohols, it has been assumed that their preparation may be best effected by reactions analogous to those employed in the making of ethers from monohydric alcohols, but prior attempts to form these ethers directly from an alcohol have proven to be quite inefficient for their production in commercial quantities.

In accordance with our invention, a process is provided for preparing glycol dialkyl ethers, which, in economy and simplicity of operation, is well adapted for commercial production. The process has particular advantage where glycol monoalkyl ethers may be readily available, since it is in the further treatment of these alcohol ethers that the novelty of the present invention resides.

We have found that a monoalkyl ether of an alkylene or polyalkylene glycol, when heated in the presence of sulfuric acid, may be converted to the corresponding dialkyl ether. Ethylene glycol monoethyl ether, for example, when refluxed for several hours under the action of small quantities of sulfuric acid, preferably not more than about 2% by weight of the ether, will react to form the diethyl ether of ethylene glycol. Sulfuric acid is regenerated during the reaction, and the acid concentration may be maintained substantially constant, or at least below the maximum indicated, by adding as the reaction proceeds further quantities of the original ether. Addition at intervals of a monohydric alcohol, in this particular instance ethanol, instead of more of the monoalkyl ether will also serve a similar purpose. To promote an efficient conversion to the dialkyl ether, the acid concentration is quite critical, and must be closely controlled, as there is a tendency toward a rapid formation of diethylene dioxide (1,4-dioxane) if the concentration goes higher than about 2% acid. With 4% acid there is little or no dialkyl ether in the reaction product. An acid concentration of less than 1% gives the most favorable ether yields, and as low as 0.002% to 0.003% acid is sufficient to carry the reaction to the desired product.

The following example is representative of one modification of the invention:

Ethylene glycol monomethyl ether was heated to its boiling point under atmospheric pressure in the presence of from 2% to 3% by weight of sulfuric acid. The acid concentration in the kettle was maintained within this range by slowly adding more of the monomethyl ether as the reaction progressed. When the distillate from this mixture gave a noticeable odor of diethylene oxide, the reaction was stopped. The material taken off from 110° C. to 120° C. was then redistilled through a larger column equipped with a return line to the column for total reflux. This distillation was conducted in the presence of 2% sulfuric acid, and after refluxing the mixture for a period of about eight hours, the reaction product was slowly taken off. The fraction distilling from 76° C. to 111° C. was collected, and the distillation stopped when the vapors gave off a pronounced diethylene oxide odor. This fraction was again redistilled and a further cut taken between 76° C. and 85° C. Treatment of this low-boiling fraction with a 50% sodium hydroxide solution was then made, forming an upper layer from which dimethyl ether of ethylene glycol was isolated. The product boiled at a temperature of 83.5° C. to 84° C. This, and other characteristics, indicate, from known properties of the compound, a very pure form of product.

In a manner substantially similar to the above, the diethyl ether of ethylene glycol, and the diethyl ether of diethylene glycol were prepared.

In adapting the process to large quantity production, variations in the specific procedure given will be apparent, and the operation can be simplified to eliminate unnecessary distillation and separation steps. Temperature and pressure conditions may vary over a wide range, and will also be influenced by the nature of the particular dialkyl ether which it is desired to form. The acid concentration should, however, be closely controlled, preferably not exceeding about 3%, although as low as 0.002% acid may in some instances be satisfactory. As above indicated, the acidity can be properly regulated by maintaining a suitable excess of the monoalkyl ether, or by adding a monohydric alcohol. To insure similar substituted alkyl groups in the final product, the alcohol should be one containing an alkyl radical corresponding to that of the original monoalkyl ether, or if a mixed dialkyl ether product is desired, a monohydric alcohol with a different alkyl radical may be used. A resulting product with two different alkyl groups may also be formed when additions of a glycol monoalkyl ether different than the starting product is used to control the acidity. In a typical plant operation it has been found advantageous to conduct the reaction under superatmospheric pressures in the presence of a considerable excess of a monohydric alcohol, sufficient to maintain an acid concentration of not more than about 1% by weight.

It will be understood that the invention is applicable to the preparation of dialkyl ether derivatives of the higher monoglycols and polyglycols, as well as to the lower molecular weight compounds specifically mentioned herein, and that the product may contain mixed, as well as similar, substituted alkyl radicals. These compounds generally are intended to be included within the term glycol dialkyl ethers, as used in the specification and claims.

We claim:

1. A process of preparing glycol dialkyl ethers, which comprises heating a glycol monoalkyl ether in the presence of sulfuric acid in an amount less than 3% by weight.

2. A process of preparing glycol dialkyl ethers, which comprises heating a glycol monoalkyl ether in the presence of less than 3% by weight of sulfuric acid, and controlling said acid concentration by maintaining during said heating an excess of at least one member of the group consisting of a glycol monoalkyl ether and a monohydric alcohol.

3. A process of preparing glycol dialkyl ethers, which comprises refluxing a glycol monoalkyl ether in the presence of about 1% by weight of sulfuric acid, maintaining said acid concentration by additions during the reaction of at least one member of the group consisting of a glycol monoalkyl ether and a monohydric alcohol, and separating the glycol dialkyl ether from the reaction mixture.

4. A process of preparing glycol dialkyl ethers, which comprises refluxing a glycol monoalkyl ether in the presence of less than 3% by weight of sulfuric acid, maintaining said acid concentration by additions during the reaction of at least one member of the group consisting of said glycol monoalkyl ether and a monohydric alcohol containing a corresponding alkyl radical, and separating the glycol dialkyl ether from the reaction mixture.

5. A process of preparing ethylene glycol dimethyl ether, which comprises heating ethylene glycol monomethyl ether in the presence of sulfuric acid in an amount less than 3% by weight.

6. A process of preparing ethylene glycol dimethyl ether, which comprises refluxing ethylene glycol monomethyl ether in the presence of less than 3% by weight of sulfuric acid, and controlling said acid concentration by maintaining during the reaction an excess of said ethylene glycol monomethyl ether.

7. A process of preparing ethylene glycol dimethyl ether, which comprises refluxing ethylene glycol monomethyl ether in the presence of about 1% by weight of sulfuric acid, maintaining said acid concentration by additions during the reaction of said ethylene glycol monomethyl ether, and separating ethylene glycol dimethyl ether from the reaction mixture.

8. A process of preparing ethylene glycol diethyl ether, which comprises heating ethylene glycol monoethyl ether in the presence of sulfuric acid in an amount less than 3% by weight.

9. A process of preparing ethylene glycol diethyl ether, which comprises refluxing ethylene glycol monoethyl ether in the presence of less than 3% by weight of sulfuric acid, and controlling said acid concentration by maintaining during the reaction an excess of said ethylene glycol monoethyl ether.

10. A process of preparing ethylene glycol diethyl ether, which comprises refluxing ethylene glycol monoethyl ether in the presence of about 1% by weight of sulfuric acid, maintaining said acid concentration by additions during the reaction of said ethylene glycol monoethyl ether, and separating ethylene glycol diethyl ether from the reaction mixture.

11. A process of preparing diethylene glycol diethyl ether, which comprises heating diethylene glycol monoethyl ether in the presence of sulfuric acid in an amount less than 3% by weight.

12. A process of preparing diethylene glycol diethyl ether, which comprises refluxing diethylene glycol monoethyl ether in the presence of less than 3% by weight of sulfuric acid, and controlling said acid concentration by maintaining during the reaction an excess of said diethylene glycol monoethyl ether.

13. A process of preparing diethylene glycol diethyl ether, which comprises refluxing diethylene glycol monoethyl ether in the presence of about 1% by weight of sulfuric acid, maintaining said acid concentration by additions during the reaction of said diethylene glycol monoethyl ether, and separating diethylene glycol diethyl ether from the reaction mixture.

HENRY L. COX.
THOMAS D. ROPER, Jr.